United States Patent
Li et al.

(10) Patent No.: US 7,995,230 B2
(45) Date of Patent: Aug. 9, 2011

(54) LABEL CREATING APPARATUS AND METHOD FOR USING THE SAME

(75) Inventors: Lei Li, Shenzhen (CN); Ping Chen, Shenzhen (CN); Pei-Qi Li, Shenzhen (CN); Li-Sha Chen, Shenzhen (CN); Yun-Fang Zhao, Shenzhen (CN); Yan-Li Xiao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 574 days.

(21) Appl. No.: 12/133,499

(22) Filed: Jun. 5, 2008

(65) Prior Publication Data

US 2009/0190160 A1    Jul. 30, 2009

(30) Foreign Application Priority Data

Jan. 29, 2008 (CN) .......................... 2008 1 0300245

(51) Int. Cl.
*G06F 3/12* (2006.01)
(52) U.S. Cl. ...................................... 358/1.15
(58) Field of Classification Search ............... 358/1.1, 358/1.15, 474; 707/705, 710, 721; 705/28, 705/37; 235/375
See application file for complete search history.

(56) References Cited

U.S. PATENT DOCUMENTS

| 5,959,275 A * | 9/1999 | Hughes et al. ............... 235/375 |
| 2001/0000086 A1 * | 4/2001 | Lewis .............................. 40/638 |

FOREIGN PATENT DOCUMENTS

| CN | 1614606 A | 5/2005 |
| CN | 1660587 A | 8/2005 |

* cited by examiner

*Primary Examiner* — Benny Tieu
*Assistant Examiner* — Jeremiah Bryar
(74) *Attorney, Agent, or Firm* — Steven M. Reiss

(57) ABSTRACT

A label creating method for creating labels to be attached to checked fixtures comprises these steps: providing a label creating system (100), which includes a database module (40) storing relational parameters and data of the checked fixtures, and a server module (30) connected to the database module; sending acquiring instruction to the server module; acquiring relational parameters and data of a checked fixture stored in the database module; creating printing instruction according to the relational parameters and data; and printing labels according to the printing instruction.

9 Claims, 3 Drawing Sheets

LABEL CREATING APPARATUS AND METHOD FOR USING THE SAME

BACKGROUND

1. Field of the Invention

The present invention relates to label creating apparatuses and, particularly, to an automatic fixture label creating apparatus and a method for using the same.

2. Description of Related Art

In a manufacturing corporation, a large number of fixtures are used. These fixtures require to be regularly checked for quality. Labels in a special format need to be created for each checking process and attached to corresponding fixtures to record results of the corresponding checking process.

Generally, the fixtures require more than one checking processes. During creation of labels in these checking processes of the fixtures, data of the number of labeled fixtures has to be manually inputted and stored into a computer and then printed to form the labels, which spends much time and may lead to mistakes being made.

Therefore, a new label creating apparatus and a new label creating method are desired in order to overcome the above-described shortcomings.

BRIEF DESCRIPTION OF THE DRAWINGS

Many aspects of the present label creating apparatus and method can be better understood with reference to the following drawings. The components in the various drawings are not necessarily drawn to scale, the emphasis instead being placed upon clearly illustrating the principles of the present label creating apparatus and method. Moreover, in the drawings, like reference numerals designate corresponding parts throughout the diagrams.

DETAILED DESCRIPTION OF THE INVENTION

Figure 1:
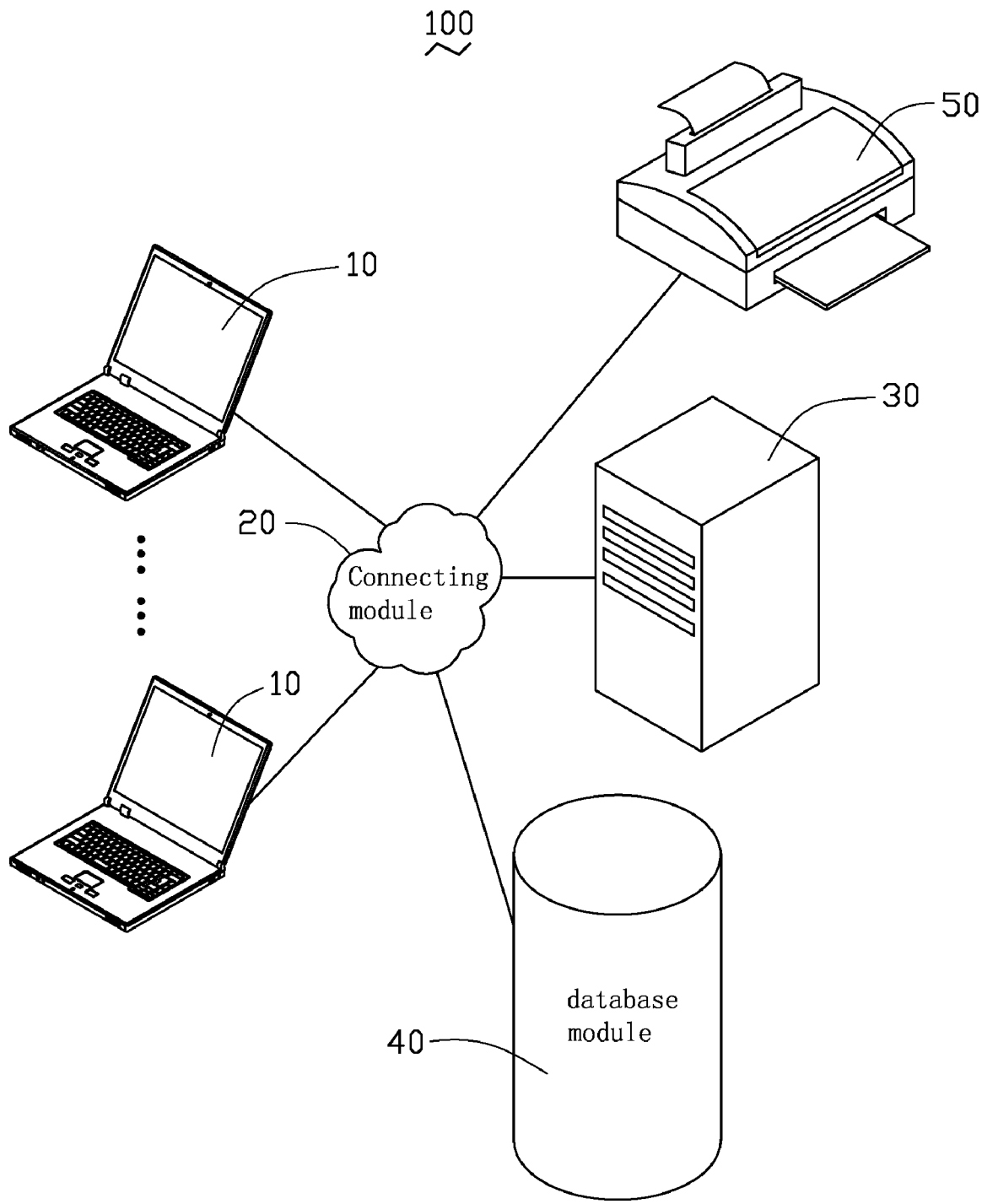
FIG. 1 is a schematic view of a label creating apparatus, according to an exemplary embodiment.

Referring to the details, FIG. 1 shows a label creating apparatus 100, according to an exemplary embodiment, for creating labels for being attached to fixtures to display relative data thereof. The label creating apparatus 100 includes a plurality of client computers 10, a connecting module 20, a server module 30, a database module 40 and at least one printer 50. The client computers 10, the database module 40 and the printers 50 are all connected to the server module 30 via the connecting module 20. The printers 50 can also be directly connected to the server module 30 to receive printing instruction.

Each client computer 10 can be, for example, a personal computer (PC), a remote mainframe computer, a machine-control computer, etc. The connecting module 20 can be, for example, an intranet or an internet. The client computers 10, the database module 40 and the printers 50 can remotely connect to the server module 30 using connecting module 20. Likewise, the connecting module 20 can provide a hard-wired or wireless connection. The server module 30 is a computer used to examine relational parameters and data of checked fixtures, create printing instruction based on the parameters and data, and send the instruction to the printer 50 for printing labels. The database module 40 stores relational parameters, such as name, serial number, manufacturing date, specifications, shape, dimension, and relational data, such as limits and averages calculated according to the aforementioned parameters of each fixture. The printer 50 prints labels according to printing instruction sent by the server module 30.

Figure 2:
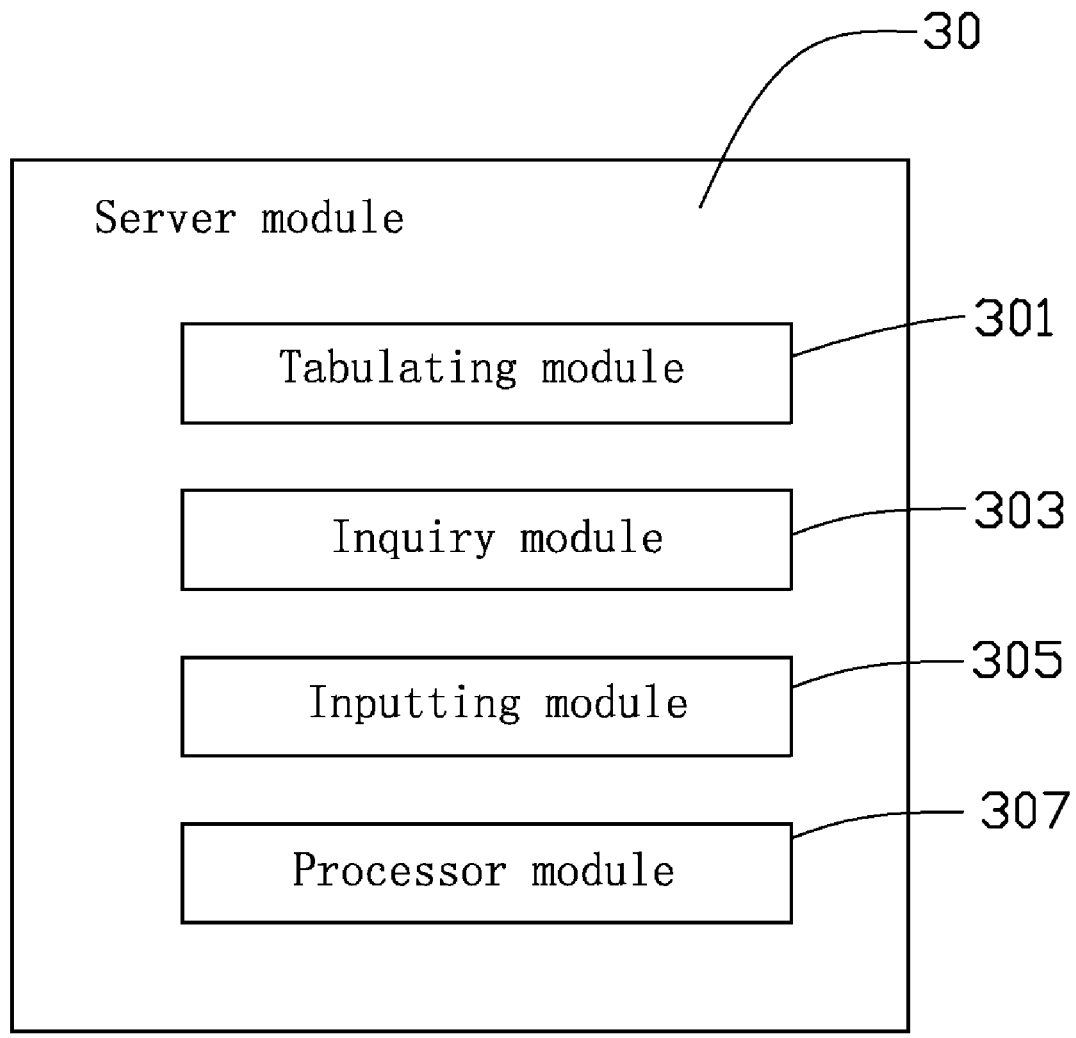
FIG. 2 is a diagram of a server module of the label creating apparatus shown in FIG. 1.

Also referring to FIG. 2, the server module 30 includes a tabulating module 301, an inquiry module 303, an inputting module 305, and a processor module 307. The tabulating module 301 is configured for creating tabulated relational data sets of the checked fixtures in predetermined formats. The inquiry module 303 is configured for acquiring relational parameters and data of the fixtures from the database module 40. The inputting module 305 is configured for inputting the parameters and data acquired by the inquiry module 303 into the tabulated data sets created by the tabulating module 301, thus a tabulated data for creating printing instruction is created.

The processor module 307 creates printing instruction according to the tabulated data created by the tabulating module 301 and the inputting module 305, and sends the printing instruction to the printer 50 to print labels. The processor module 307 can also set printing formats of the printed labels, such as characters, tabulates and bar codes.

Figure 3:
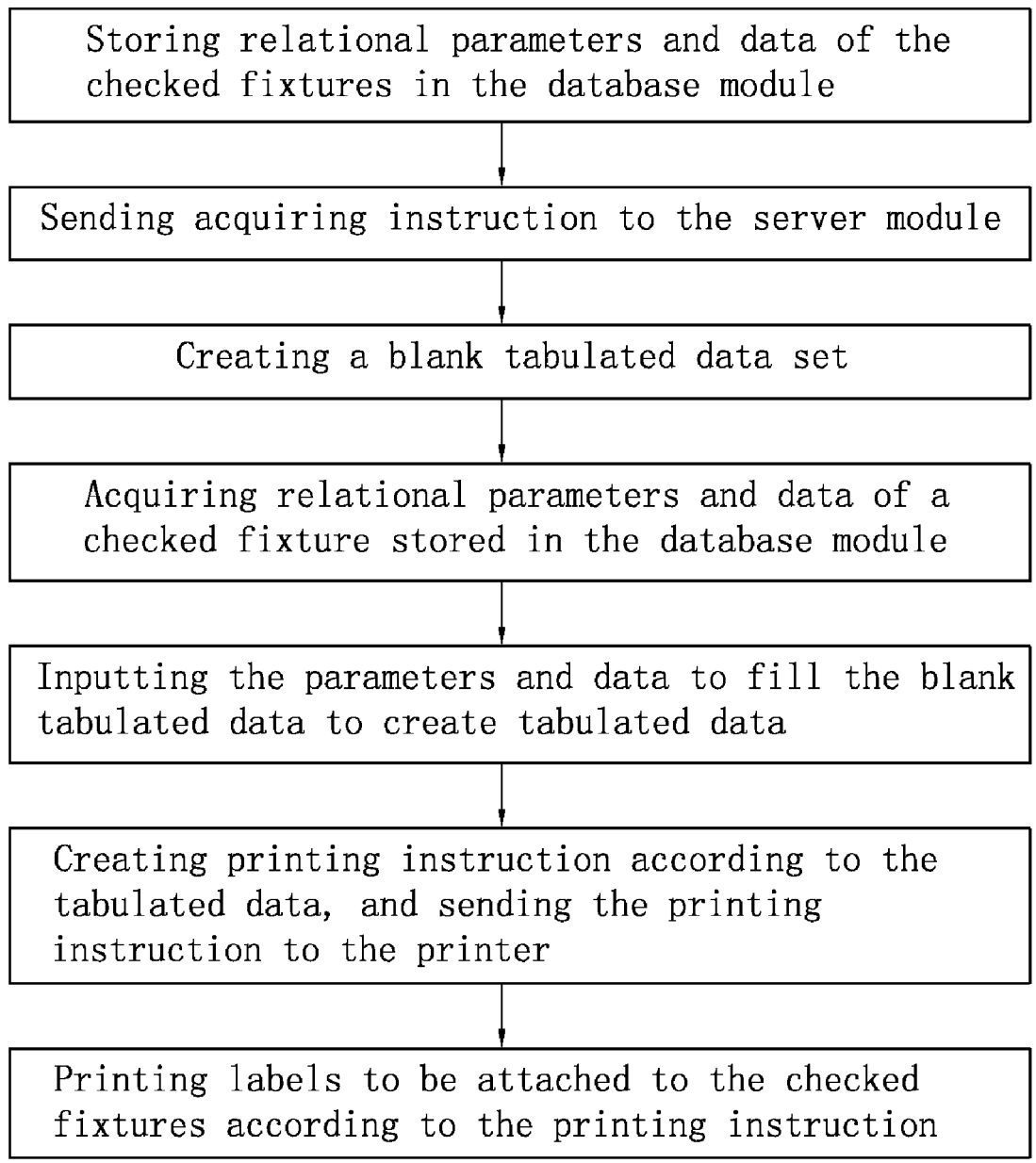
FIG. 3 is a flow chart of a label creating method, according to an exemplary embodiment.

Referring to FIG. 3, a method for creating checking labels, according to an exemplary embodiment, is provided. The method is essentially using the aforementioned label creating apparatus 100 to print labels as follows.

First, relational parameters and data of the checked fixtures are stored in the database module 40 of the label creating apparatus 100. Understandably, if the label creating apparatus 100 is not used to create labels of the checked fixtures for the first time, the relational parameters and data of the checked fixtures need not to be inputted into the database module 40 again if they are not changed; in this way, most workload of the storing step can be omitted.

Second, acquiring instructions are sent to the server module 30 via anyone of the client computers 10 and the connecting module 20.

Third, a blank tabulated data set is created via the tabulating module 301, and stored in the database module 40.

Fourth, relational parameters and data of a checked fixture stored in the database module 40 are acquired via the inquiry module 303. Understandably, all relational parameters and data of each checked fixture can be inquired via searching anyone of the parameters or data of the fixture stored in the database module 40.

Fifth, the parameters and data are input to fill the blank tabulated data set via the inputting module 305, thus creating tabulated data for creating printing instruction;

Sixth, printing instructions are created according to the tabulated data, and sent to the printer 50 via the processor module 307.

Seventh, labels to be attached to the checked fixtures are printed according to the printing instruction via the printer 50.

Understandably, the label creating system 100 and the aforementioned label creating method can automatically create labels attached to fixtures and prevent mistakes typically created/made by manually inputting parameters and data in creation of labels. In this way, the accuracy and reliability of the assessment is improved.

Furthermore, after the fixtures are checked once, their relational parameters and data generally do not need to be inputted into the label creating apparatus 100 for other subsequent checking processes. Thus, the subsequent checking processes are simple and spend less time.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A label creating apparatus used for creating labels to be attached to checked fixtures, comprising:
   a database module configured for storing relational parameters and data of the checked fixtures, wherein the parameters include at least name, serial number, manufacturing date, specification, shape, and dimension of each checked fixture, and the data includes at least limits and averages of the parameters of all the checked fixtures;
   a server module including an inquiry module, an inputting module and a processor module, the inquiry module being configured for acquiring relational parameters and data of the checked fixtures, the inputting module configured for creating tabulated data, the processor module being configured for creating printing instruction according to the tabulated parameters and data; and
   a connecting module coupled to both the database module and the server module, the database module and the server module thereby being linked with each other via the connecting module; wherein when any one of the parameters or data of one checked fixture is searched in the database module, the inquiry module acquires all the parameters and data of the checked fixture stored in the database module, the inputting module creates tabulated data filled with all the parameters and data of the checked fixture, and the processor module creates printing instruction to be printed as labels according to the tabulated data; wherein the label creating apparatus further comprises at least one printer, the server module sending the printing instruction to the printer to print labels to be attached to the fixtures.

2. The label creating apparatus as claimed in claim 1, further comprising at least one client computer connected to the database module and the server module via the connecting module.

3. The label creating apparatus as claimed in claim 1, wherein the server module further includes a tabulating module configured for creating tabulated data sets.

4. The label creating apparatus as claimed in claim 3, wherein the inputting module inputs the relational parameters and data of the checked fixtures acquired by the inquiry module into the tabulated data sets created by the tabulating module to create the tabulated data.

5. A label creating method for creating labels to be attached to checked fixtures, comprising these steps:
   providing a label creating system, which includes a database module storing relational parameters and data of the checked fixtures, and a server module connected to the database module, wherein the parameters include at least name, serial number, manufacturing date, specification, shape, and dimension of each checked fixture, and the data includes at least limits and averages of the parameters of all the checked fixtures;
   sending acquiring instruction to the server module;
   searching any one of the parameters and data of a checked fixture, thereby acquiring all the relational parameters and data of the checked fixture stored in the database module;
   creating printing instruction according to all the relational parameters and data of the checked fixture; and
   printing labels of the checked fixture according to the printing instruction.

6. The method as claimed in claim 5, further comprising a step of creating a blank tabulated data set via the server module after the step of sending acquiring instruction to the server module.

7. The method as claimed in claim 6, further comprising a step of inputting the parameters and data to fill the blank tabulated data set to create tabulated data for creating printing instruction after the step of searching any one of the parameters and data of a checked fixture.

8. The method as claimed in claim 5, wherein the label creating system includes at least one client computer configured for sending the acquiring instruction.

9. The method as claimed in claim 5, wherein the label creating system includes at least one printer configured for printing labels to be attached to the checked fixtures according to the printing instruction.

* * * * *